United States Patent [19]

Kelso

[11] 4,214,132
[45] Jul. 22, 1980

[54] TESTING TOOLS FOR MODULAR TELEPHONE SYSTEM

[76] Inventor: Thomas W. Kelso, P.O. Box 452, Little River, Tex. 76554

[21] Appl. No.: 871,857

[22] Filed: Jan. 24, 1978

[51] Int. Cl.$^2$ ............................................. H04M 1/24
[52] U.S. Cl. ................................. 179/175; 179/1 PC; 324/158 P; 339/151 B
[58] Field of Search ............ 179/175, 175.1, 175.3 R, 179/1 PC; 339/31 T, 151 B, 222, 28, 32 R, 49 R; 324/126, 149, 158 P

[56] References Cited

U.S. PATENT DOCUMENTS

| | | | |
|---|---|---|---|
| 1,697,237 | 1/1929 | Greene | 179/1 PC |
| 2,249,153 | 7/1941 | Martin | 178/69 R |
| 2,367,013 | 1/1945 | Edmonds | 141/70 |
| 2,648,052 | 8/1953 | Graham et al. | 339/109 |
| 2,956,229 | 10/1960 | Henel | 324/133 |
| 3,600,678 | 8/1971 | Garrett et al. | 324/133 |
| 3,699,498 | 10/1972 | Hardesty et al. | 339/64 M |
| 3,711,661 | 1/1973 | Garrett et al. | 179/175.1 R |
| 3,729,597 | 4/1973 | Garrett et al. | 179/175 |
| 3,736,387 | 5/1973 | Thompson et al. | 179/175 |
| 3,806,803 | 4/1974 | Hall | 324/133 |
| 3,808,532 | 4/1974 | Yuska | 324/158 P |
| 3,870,836 | 3/1975 | Kusama | 179/175.3 R |
| 3,922,507 | 11/1975 | White | 179/175.3 R |
| 3,976,849 | 8/1976 | Champan | 179/175.25 |
| 3,986,106 | 10/1976 | Shuck et al. | 324/51 |
| 4,002,861 | 1/1977 | Putt | 179/175 |
| 4,021,732 | 5/1977 | Metcalf | 324/149 |

OTHER PUBLICATIONS

Suttle Apparatus Corporation Price List effective Feb. 1, 1978.
Brochure from Suttle Apparatus Corp.
"Field Aids", by Dynatel Corp., Issue No. 4.

*Primary Examiner*—Douglas W. Olms
*Attorney, Agent, or Firm*—Snider, Sterne & Saidman

[57] ABSTRACT

A set of testing tools for modular telephone systems of the type which employ a telephone having a base, a terminal block, a line cord interconnecting the base and terminal block, a handset, and a receiver cord interconnecting the handset and base. The connections between the line cord, receiver cord, base and terminal block are effected by known miniature jacks and plugs. The present invention provides a testing tool equipped with substantially identical miniature jacks and/or plugs and permits the house cable to be identified and the presence of dial tone, ground and battery to be checked without requiring the terminal block to be removed from the wall. The testing tools also permit trouble to be localized in standard desk, wall, Princess ® and Trimline ® telephone sets without having to dismantle same.

12 Claims, 22 Drawing Figures

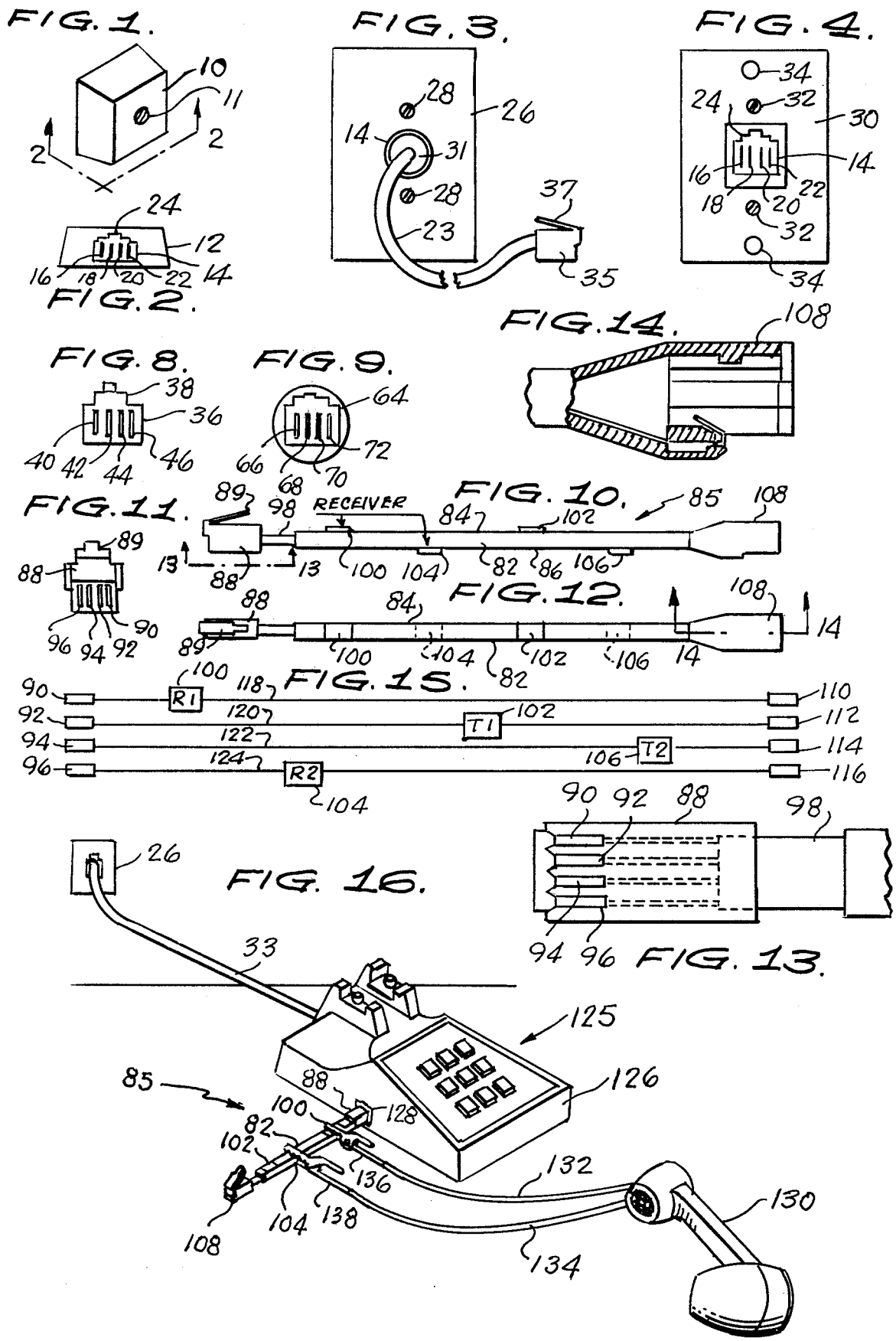

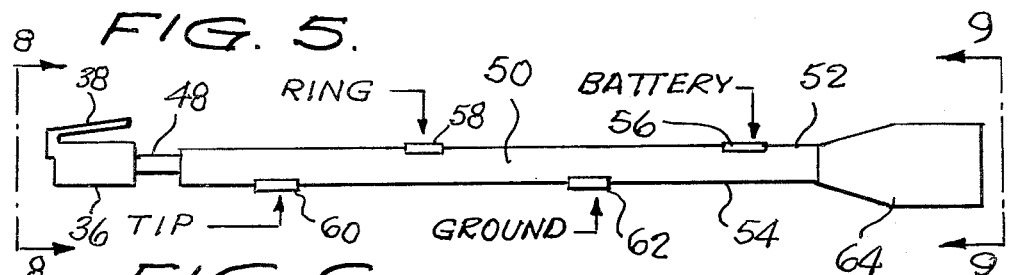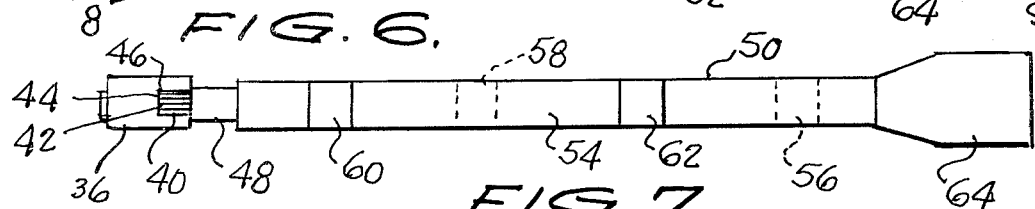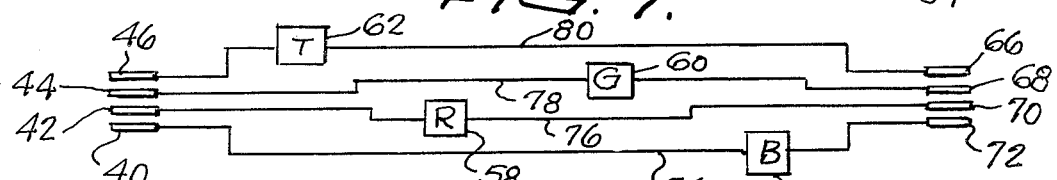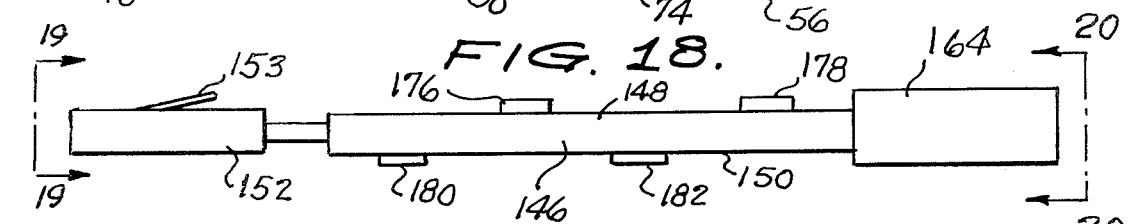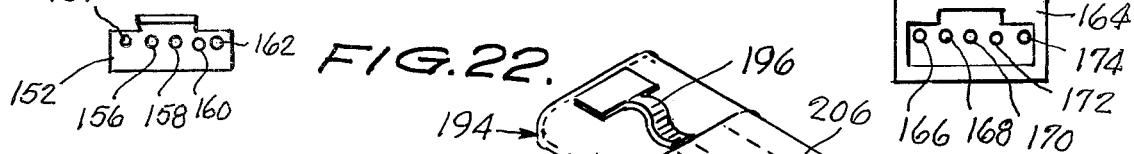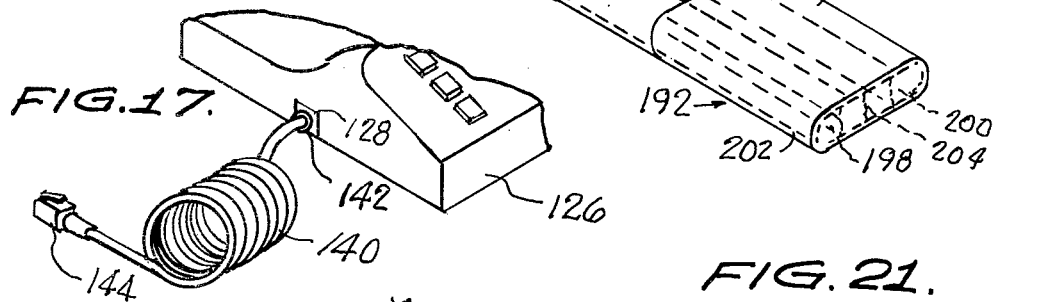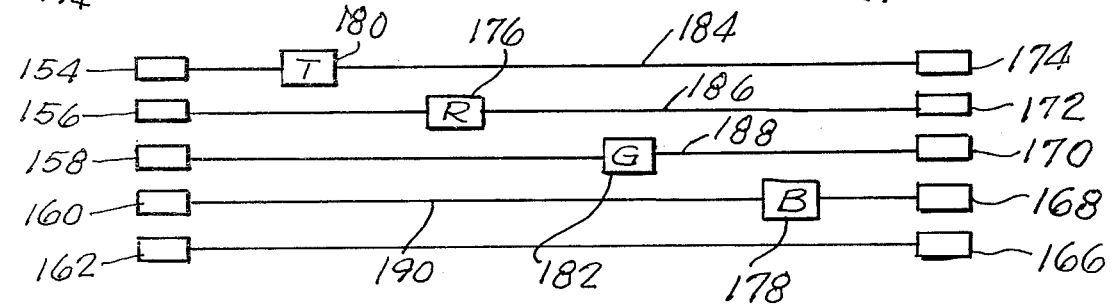

TESTING TOOLS FOR MODULAR TELEPHONE SYSTEM

BACKGROUND OF THE INVENTION

1. Field of the Invention

The present invention is related to testing apparatus and, more particularly, is directed towards a set of tools which may be adapted for testing the various components and interconnecting cables of standard telephone systems without requiring dismantling of same.

2. Description of the Prior Art

Standard modular telephone systems which utilize miniature jacks and plugs to interconnect the various components thereof are now widely utilized in the communication industry.

Such a system employs a telephone having a base, a handset, a receiver cord which is generally retractile and which interconnects the base and the handset, a wall-mounted terminal block, and a line cord which interconnects the terminal block with the telephone base.

The terminal block, which may be of a non-flush, flush or wall phone type, includes a special miniature jack which is identical to a second jack positioned in the rear of the base of the telephone. The line cord interconnecting the terminal block and base is terminated at both ends by a pair of identical miniature plugs which are sized to mate with the miniature jacks in the terminal block and telephone base. The miniature plugs include a quick connect-disconnect latch to greatly facilitate installation and separation of the line cord from the block and base. These miniature plugs and jacks include a plurality, usually four, wire terminals positioned therein for making electrical contact with correspondingly positioned wire terminals in the respective jack or plug. The advantages, features, and detailed structural design of such miniature jacks and mating plugs is typified in the Hardesty et al U.S. Pat. No. 3,699,498, issued Oct. 17, 1972 and assigned to Bell Telephone Laboratories Incorporated and Western Electric Company Incorporated.

Similarly, the retractile receiver cord is terminated at both ends by identical miniature plugs which are sized so as to mate with miniature jacks positioned respectively in the handset and telephone base. To avoid mistakes upon installation, the size of the jacks and plugs coupling the handset to the telephone base is usually different than the size of the jacks and plugs coupling the telephone base to the terminal block. Further, a third size and style of plugs and jacks are utilized in Trimline ® telephones between the handset and the telephone base, as distinguished from the size of jacks and plugs presently being utilized between the handset and telephone base in standard desk telephones (Model 500), wall telephones (Model 554), and Princess ® telephones. The model numbers and trademarks referred to herein are those which identify products of the Western Electric Company Incorporated of New York, N.Y., with which the devices of the present invention are particularly adapted to be utilized.

In the installation and repair of such modular telephone equipment, a serviceman must be able to identify the house cable, and check for dial tone, ground and battery. Such procedures generally require the use of a sounding device known as a "beeper", as well as a testset which consists simply of a hand-held receiver and transmitter having a pair of cables extending therefrom and terminating in alligator clips, for example.

Since the miniature jacks and plugs presently utilized in modular telephone systems are not amenable to direct connection of relatively large alligator clips used on such beepers and testsets, in order to perform such tests, the terminal block cover must be removed from the wall, or the telephone base must be dismantled, in order to obtain access to the exposed terminal wiring on the other side of the various jacks.

Dismantling of the terminal block covers or telephone bases is clearly time consuming. Further, as a result of the often fragile interconnection between the wiring cables and miniature jacks, the wiring is likely to be damaged when applying or removing the relatively bulky alligator clips.

It is clear, therefore, that it would be highly desirable if apparatus could be provided which would both avoid the time consuming necessity of dismantling the terminal blocks and telephone bases incident to the installation and/or repair of telephone sets and, at the same time, avoid altogether the possibility of damaging the internal wiring of such components. It is towards this end that the present invention is advanced.

Prior art United States patents in this general area of which I am aware include U.S. Pat. Nos. 2,249,153; 2,367,013; 2,648,052; 2,956,229; 3,600,678; 3,699,498; 3,711,611; 3,729,597; 3,736,387; 3,806,803; 3,870,836; 3,922,507; 3,976,849; 3,986,106; and 4,002,861.

OBJECTS AND SUMMARY OF THE INVENTION

It is therefore a primary object of the present invention to provide a testing tool for modular telephone systems which overcomes and avoids all of the disadvantages noted above.

Another object of the present invention is to provide a novel and unique testing tool which may be utilized with modular telephone systems to identify the house cable, and check for dial tone, ground and battery without requiring the terminal block cover to be removed.

Another object of the present invention is to provide a new and improved testing tool for telephone systems which assists in localizing trouble in desk sets, wall sets, Princess ® and Trimline ® telephone sets without requiring same to be dismantled.

An additional object of the present invention is to provide a set of testing tools for modular telephone systems which are simple to construct, utilize readily available components, are inexpensive to manufacture, and which provide a great savings in time and labor in the installation, testing and repair of telephones.

A still further object of the present invention is to provide a set of test tools for modular telephone equipment which obviate altogether the possibility of damaging internal wiring during the installation, testing and repair of certain, standard telephone sets.

The foregoing and other objects are attained in accordance with one aspect of the present invention through the provision of a testing tool for telephone systems of the type which include a telephone having a base with a pair of miniature jacks, a terminal block having another miniature jack, a line cord terminated by miniature plugs for interconnecting the terminal block and the base, a handset having a further miniature jack, and a receiver cord terminated by further miniature plugs for interconnecting the handset and the base. Each of the miniature plugs and jacks have a plurality of wires terminated therein. The testing tool comprises connector means adapted to mate with one of the plugs or jacks and having a plurality of test wires terminated therein and a plurality of exposed conductor means connected in series respectively with the plurality of test wires for permitting attachment of test apparatus thereto.

In accordance with more detailed aspects of the present invention, the exposed conductor means comprises a plurality of exposed conductor pads which are connected in series respectively with the plurality of test wires. The present invention further comprises means for supporting the plurality of exposed conductor pads which, in a preferred embodiment, comprises a substantially rigid, elongated support member having upper and lower substantially planar surfaces along which the pads are positioned in a linear, spaced relationship.

In accordance with other aspects of the present invention, the connector means may comprise a test jack substantially identical with one of the miniature jacks in the telephone system and which is positioned at one end of the elongated support member. Alternatively, the connector means may comprise a test plug substantially identical with one of the miniature plugs in the telephone system and also positioned at one end of the elongated support member.

In more detailed embodiments of the present invention, the elongated support member may have a test jack positioned at one end and a test plug positioned at the other end, corresponding wire terminals in the jack and plug being connected in series with the corresponding exposed conductor pads. The spacing of the pads along the support member permit the relatively large alligator clips of the beeper and testsets, for example, to be easily clamped thereto without requiring dismantling of either the terminal block covers or the telephone bases.

In accordance with more specific aspects of the present invention, the testing tool may be provided in three distinct embodiments: a mounting tool having jacks and plugs adapted to mate with corresponding jacks and plugs in the terminal block and rear of the telephone base; a receiver tool with jacks and plugs sized to mate with those jacks and plugs provided in the handset and base of desk, wall and Princess ® telephone sets; and a Trimline ® tool having a plug and jack adapted to mate with correspondingly sized plugs and jacks in the handset and base of a Trimline ® telephone set. A convenient carrying case may be provided to house the three tools in a serviceman's pocket.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a plan view of a typical non-flush, terminal block installation of a telephone system;

FIG. 2 is a bottom view of the non-flush terminal block illustrated in FIG. 1;

FIG. 3 illustrates a flush terminal block of a modular telephone system having a modular line cord attached thereto;

FIG. 4 is a plan view of a wall telephone terminal block;

FIG. 5 is an elevational view illustrating one embodiment of the test tool of the present invention which may be utilized in connection with the terminal blocks of FIG. 1, 3 or 4;

FIG. 6 is a bottom view of the preferred embodiment illustrated in FIG. 5;

FIG. 7 is a wiring schematic of the tool illustrated in FIGS. 5 and 6;

FIG. 8 is an end view illustrating the miniature plug of the preferred embodiment of FIG. 5 and taken along line 8—8 thereof;

FIG. 9 is an end view of the preferred embodiment shown in FIG. 5 and taken along line 9—9 thereof which illustrates the miniature jack in greater detail;

FIG. 10 is a side view of an alternative embodiment of a testing tool in accordance with the present invention;

FIG. 11 is a side view of the tool illustrated in FIG. 10;

FIG. 12 is a top view of the preferred embodiment illustrated in FIG. 10;

FIG. 13 is an enlarged, cut-away view of the miniature plug utilized with the preferred embodiment illustrated in FIG. 10 and taken along line 13—13 thereof;

FIG. 14 is an enlarged, sectional view which illustrates the internal structure of the miniature jack utilized with the alternate embodiment shown in FIG. 12 and taken along line 14—14 thereof;

FIG. 15 is a wiring schematic of the alternate embodiment illustrated in FIG. 10;

FIG. 16 is a perspective view of certain components of a modular telephone system with which the test tool of FIGS. 10 through 15 may be utilized;

FIG. 17 illustrates an alternate use of the test tool of FIGS. 10 through 15;

FIG. 18 is a side view of a third and alternative embodiment of a test tool in accordance with the teachings of the present invention;

FIG. 19 is an end view of the miniature plug of the embodiment shown in FIG. 18 and taken along line 19—19 thereof;

FIG. 20 is an end view of the miniature jack utilized with the test tool illustrated in FIG. 18 and taken along line 20—20 thereof;

FIG. 21 is a schematic wiring diagram of the test tool illustrated in FIG. 18; and FIG. 22 is a perspective view illustrating a carrying case which may be utilized to house the three basic embodiments of the present invention.

DETAILED DESCRIPTION OF THE PREFERRED EMBODIMENTS

Referring now to the drawings, wherein like reference numerals represent identical or corresponding parts throughout the several views, and more particularly to FIGS. 1 and 2 thereof, there is illustrated in perspective and bottom views a typical non-flush type terminal block of a modular telephone system with which the present invention is particularly designed to be utilized.

The non-flush terminal block 10 is mounted to the wall or a mounting bracket by a screw 11. Flush mounted on the bottom face 12 of terminal block 10 is a standard female connector or miniature jack 14 which is sized and adapted to receive a standard, miniature male connector or plug, such as plug 35 of FIG. 3. As pointed out hereinabove, the particular structure and design details of jack 14 and plug 35 are well-known, as typified by the disclosure in Hardesty et al U.S. Pat. No. 3,699,498.

More particularly, the jack 14 has four copper wires 16, 18, 20 and 22 terminated therein. Wires 16, 18, 20 and 22 are the terminal ends of standardized color-coded wiring, which is presently yellow, green, red and black, respectively.

Jack 14 includes an upper stepped portion 24 which is adapted to receive a locking latch 37 of plug 35, as is conventional.

Illustrated in FIG. 3 is a flush style terminal block 26 which is wall-mounted by means of mounting screws 28 and which includes a standard miniature jack 14 centrally disposed therein. Also shown in FIG. 3 is a standard line cord for a telephone set which connects the terminal block 26 to the base of the telephone itself. The line cord 33 is terminated at both ends thereof by miniature plugs 31 and 35 for respectively mating with the jack 14 and the similarly-sized jack on the rear of a standard telephone base (not shown in this view).

FIG. 4 illustrates a wall telephone type of terminal block 30 which includes mounting screws 32 and apertures 34. A standard miniature jack 14 is centrally disposed therein, and the line cord 33 illustrated in FIG. 3 may be mated with equal facility to the jacks 14 of either FIG. 2 or 4.

Referring now to FIGS. 5 through 9, a first preferred embodiment of the present invention is illustrated and consists of a mounting tool which may be utilized in testing for dial tone, ground and battery, as well as for identifying the house cable, in connection with the terminal blocks and line cords illustrated in FIGS. 1, 3 and 4.

As illustrated in FIG. 5, the mounting tool includes a miniature plug 36 at one end thereof and having a standard latch 38 extending from one side. Plug 36 is substantially identical in size to plugs 31 and 35, and is adapted to be received within standard miniature jack 14. In the best mode presently contemplated, plug 36 may comprise Part No. Cord D4Bu29 1291583 as manufactured by the Western Electric Company Incorporated.

As shown in FIGS. 6 and 7, plug 36 terminates with four exposed copper wires 40, 42, 44 and 46 which are respectively referred to in the trade as the battery, ring, ground and tip terminals. The four wires, 40, 42, 44 and 46 from plug 36 are preferably mounted in a flexible sheath or cable 48 which extends from one end of a rigid, elongated support member 50.

Support member 50, which is preferably made of molded plastic or equivalent material, is preferably hollow to house wiring therewithin and includes an upper planar surface 52 upon which are disposed two exposed conductor pads 56 and 58 which are preferably comprised of bare copper or like conductor. Pads 56 and 58 respectively represent connectors to the battery and ring terminals in plug 36 and, to that end, are connected in series with terminal wires 40 and 42 (see FIG. 7) respectively.

On the lower surface 54 of rigid elongated support member 50 are disposed two additional exposed conductor pads 60 and 62, also preferably comprised of copper or like conductor. Pads 60 and 62 are connected in series with terminal wires 44 and 46 and therefore represent a ground pad 60 and a tip pad 62.

The sides, top or bottom surfaces of support member 50 are preferably labeled as to the terminal represented by each of the pads 56, 58, 60 and 62 to facilitate use of the present invention. Note with respect to FIGS. 5 and 6 that the pads 56, 58, 60 and 62 are spaced longitudinally along support member 50 in such a manner that each pad does not overlap an adjacent pad. The purpose of such spacing is to permit an alligator clip, for example, to be attached to an individual one of the pads without contacting an adjacent pad. The support member 50 should therefore be constructed of a durable plastic or equivalent material which will withstand the use for which the present invention is intended, as will be described in greater detail hereinafter.

Positioned at the other end of support member 30 is a miniature jack connector 64, preferably formed of molded plastic and having a tapered outer surface. As seen in FIG. 9, jack 64 includes four terminal wires 66, 68, 70 and 72 which correspond respectively to the tip, ground, ring and battery terminals. The internal geometry of jack 64 is substantially identical to, in the best mode presently contemplated, that of jack 14 of FIGS. 1, 3 and 4 and is equivalent to that of standard Part No. Jack 623D4 1302307 manufactured by Western Electric Company Incorporated.

Referring to FIG. 7, it may be appreciated that within member 50 are positioned series wires 74, 76, 78 and 80 which connect the exposed conductor pads 56, 58, 60 and 62, respectively, with their associated wire terminals in plug 36 and jack 64.

In using the mounting tool illustrated in FIGS. 5 through 9, four individual tests or operations may be performed in connection with the terminal blocks shown in FIGS. 1, 3 and 4 which previously required removal of the cover plate and possible damage to inside wiring. In the following tests and operations, the mounting tool is first connected to the terminal block by inserting plug 36 into jack 14. Then, any of the following four tests or operations may be performed:

1. A "beeper" (emitting an audible signal) may be connected to the ring 58 and tip 60 conductor pads to assist in locating the inside wiring at the protector or terminal to enable a cross-connect to be made at the terminal.

2. A testset (such as testset 130 of FIG. 16) is connected (via leads 132 and 134 and alligator clips 136 and 138 of FIG. 16) to the ring pad 58 and tip pad 60 to check for the presence of dial tone.

3. The alligator clips of the testset are connected to the battery pad 56 and ground pad 62 to check for the presence of the necessary voltage to operate the lights in the Trimline ® and Princess ® telephone sets.

4. The leads of the testset are connected to the tip pad 60 (or ring pad 58) and ground pad 62 to check for ground (if ground is needed for a party line).

The mounting tool of FIGS. 5 through 9 may also be utilized to test for the integrity of the line cord 33 (see FIG. 3). With line cord 33 installed to the terminal block 26 (or terminal block 10 or 30) the miniature female jack 64 of the mounting tool is coupled with the plug 35 of line cord 33. The leads of the testset may then be connected to the ring pad 58 and tip pad 60 to check for the continuity of the tip and ring through line cord 33. Similarly, the clips of the testset may be connected to battery pad 56 and ground pad 62 to check for continuity of the battery and ground in line cord 33. Such tests may be utilized to localize trouble in any modular telephone which uses a line cord 33.

Referring now FIGS. 10 through 15, an alternate embodiment of a test tool in accordance with the present invention is therein illustrated and will now be explained. The tool of FIGS. 10 through 15 may generally be referred to as a receiver tool, since it is designed to localize any trouble in modular telephones and receiver cords. The actual structure of the receiver tool, indicated generally by reference numeral 85, is substantially identical to that of the mounting tool illustrated in FIGS. 5 through 9. The major differences are the utilization of the various pads, as well as the size and model number of the plugs and jacks.

Referring now to the drawings, FIG. 10 illustrates a rigid support member 82 having upper and lower planar parallel surfaces 84 and 86. A miniature plug 88 having a locking latch 89 is affixed to one end of member 82, while a miniature jack 108 having a tapered outer surface is affixed to the other end thereof. In the best mode presently contemplated, plug 88 and jack 108 are structured identically to, for example, Part Nos. Cord H 4Du3 1291641 and Jack 616 B 1302042 respectively manufactured by Western Electric Company.

Plug 88 has four wires 90, 92, 94 and 96 terminating therein which may respectively be referred to as a first receiver terminal, a first transmitter terminal, a second transmitter terminal, and a second receiver terminal. The receiver terminals refer to wires which connect to the earpiece of the headset of a modular telephone set, while the transmitter terminals refer to wires which lead to the mouthpiece of a standard headset.

The wires from terminals 90, 92, 94 and 96 are bound in a flexible wire sheath or cable 98 which emanates from one end of support member 82.

On the upper surface 84 of tool 85 are positioned an exposed conductive receiver pad 100 and an exposed conductive transmitter pad 102. On the lower surface 86 are positioned an exposed, conductive receiver pad 104 and an exposed, conductive transmitter pad 106. As with the mounting tool, pads 100, 102, 104 and 106 are all preferably comprised of copper and are connected in series respectively with terminals 90, 92, 94 and 96 via series connected wires 118, 120, 122 and 124 (see FIG. 15).

Jack 108 has a tapered outer surface and includes four wire terminals 110, 112, 114 and 116 which correspond respectively to a first receiver terminal, a first transmitter terminal, a second transmitter terminal, and a second receiver terminal.

FIG. 16 illustrates the receiver tool 85 of the present invention during use in checking for dial tone through the standard, modular telephone set 125. Telephone 125 is mounted in a base 126 having a standard miniature jack 128 positioned on one side thereof. Positioned on the rear of base 126 is another miniature jack (not shown), similar in shape but somewhat larger than jack 128, to which is mounted line cord 33, the other end of which is connected to a wall-mounted terminal block 26, as aforedescribed with reference to FIG. 3.

Referring back to FIG. 16, a standard testset 130 is illustrated which includes a pair of leads 132 and 134 to the ends of which are respectively connected a pair of alligator clips 136 and 138. In use as illustrated in FIG. 16, the plug 88 of receiver tool 85 is inserted within jack 128 of base 126 of telephone 125. Clips 136 and 138 of testset 130 are then fastened to the receiver pads 100 and 104, and the testset 130 is then monitored by a technician to check for presence of dial tone through the telephone set 125. This test procedure may be utilized to localize trouble in any modular telephone, in addition to the desk set illustrated in FIG. 16, as well as wall phones, without dismantling the sets.

Another use of the receiver tool of FIGS. 10 through 15 is illustrated in FIG. 17 wherein a miniature plug 142 on one end of retractile cord 140 is shown coupled with jack 128. Retractile cord 140, normally connected between base 126 and the handset (not shown) includes an identical plug 144 at the other end thereof which is normally designed to mate with a similar miniature jack formed in the handset (not shown). In use, the cord 140 may be tested for continuity by connecting the jack 108 of receiver tool 85 to plug 144 of cord 140. The testset may then be connected to the receiver pads 100 and 104 to check for the presence of dial tone through the receiver cord 140. This operation may be utilized to localize any trouble in any modular receiver cord utilized on desk or wall phones.

Since the handset of the Trimline ® includes both the push-button dialing mechanism and a light, the receiver tool required to test same utilizes different plugs and jacks than heretofore described in connection with standard desk or wall telephones. Accordingly, a third embodiment of a testing tool according to the present invention is illustrated in FIGS. 18 through 21 and includes a support 46 having an upper surface 148 and a lower surface 150. A standard plug 152 is provided at one end of support 146 and includes a latch 153. At the other end of support 146 is positioned a standard miniature jack 164. In the best mode presently contemplated, plug 152 and jack 164 correspond to the structure of Part Nos. Cord HSAA56 1994624 and not applicable as manufactured by Western Electric Company Incorporated.

Miniature plug 152 and miniature jack 164 differ from the plugs and jacks described hereinabove in providing five available contacts, one of which, however, is normally vacant. Plug 152, for example, includes five contacts 154, 156, 158, 160 and 162 which correspond respectively to the tip, ring, ground, battery and vacant wire terminals, while jack 164 includes five contacts 166, 168, 170, 172 and 174 corresponding respectively to vacant, battery, ground, ring and tip terminals.

On the upper surface 148 of support 146 are positioned a pair of exposed pads 176 and 178 which correspond to the ring and battery terminals of plug 152 and jack 164, while on the lower surface 150 are a pair of alternately spaced exposed conductor pads 180 and 182 which correspond respectively to the tip and ground terminals.

As illustrated in FIG. 21, series wires 184, 186, 188 and 190 interconnect the pads 180, 176, 182 and 178, respectively with their associated terminals in plug 152 and jack 164.

In using the tool of FIGS. 18 through 21, the plug 152 thereof is inserted within a similarly sized jack in the base of the Trimline ® set. The following three operations may then be performed:

1. The testset terminals may be attached to ring pad 176 and tip pad 180 to check for dial tone through the Trimline ® set;

2. The clips on the testset may be connected to the battery pad 178 and ground pad 182 to check for the presence of the operating voltage to operate the lights in the handset (not shown) (the sound through the headset in the presence of voltage being akin to a low roar); and 3. The testset clips are attached to the tip pad 180 or ring pad 176 and the ground pad 182 to check for ground (if ground is needed for a party line).

The foregoing operations are conveniently utilized to localize any trouble in Trimline ® desk or wall telephone sets, without requiring dismantling.

Similar to the use of the mounting tool 85 with the retractile cord 140 of desk set 126 illustrated in FIG. 17, the Trimline ® tool of FIGS. 18 through 21 may be utilized to check for continuity in the Trimline ® retractile cord (not shown). The retractile cord for the Trimline ® includes two substantially identical plugs positioned at each end thereof, one end of which is inserted into the jack in the base of the Trimline ®. To the other plug in the cord is connected jack 164 of the receiver tool of FIG. 18. Then the following tests may be performed:

1. Attaching the testset leads to the ring pad 176 and tip pad 180, dial tone through the receiver cord may be checked;

2. Connecting the leads of the testset to the battery pad 178 and the ground pad 182, the presence of the voltage through the receiver cord may be checked; and 3. Attaching the testset to the tip pad 180 or the ring pad 176 and the ground pad 182, the presence of ground through the receiver cord may be checked (if ground is needed for a party line).

The foregoing operations may be utilized to localize trouble in the Trimline ® desk and wall receiver cords.

Referring to FIG. 22, there is illustrated a perspective view of a carrying case which may be utilized to house the three preferred embodiments of the present invention illustrated in FIGS. 5, 10 and 18. The case includes an elongated main body indicated generally by reference numeral 192 and a lid indicated generally by numeral 194 which interfits on the main body 192. A clip 196 is preferably provided on the lid 194 for conveniently attaching the case to a breast pocket or the like. In the main body portion 192 are positioned divider walls 198 and 200, for defining three elongated compartments 202, 204, and 206 for receiving the three preferred embodiments of the tools of the present invention.

Obviously, numerous modifications and variations of the present invention are possible in light of the above teachings. It is therefore to be understood that within the scope of the appended claims, the invention may be practiced otherwise than as specifically described herein.

I claim as my invention:

1. A testing tool for telephone systems of the type which include a telephone having a base with a pair of miniature jacks, a terminal block having another miniature jack, a line cord terminated by miniature plugs for interconnecting said terminal block and said base, a handset having a further miniature jack, and a receiver cord terminated by further miniature plugs for interconnecting said handset and said base, each of said miniature plugs and jacks having a plurality of wires terminated therein, which comprises:
   connector means adapted to mate with one of said plugs or jacks and having a plurality of test wires terminated therein;
   a plurality of exposed conductor pads connected in series respectively with said plurality of test wires for permitting attachment of test apparatus thereto; and
   rigid, elongated means for supporting said plurality of exposed conductor pads in a linear, spaced relationship thereon.

2. A testing tool as set forth in claim 1, wherein said rigid elongated means comprises a support member having upper and lower substantially planar surfaces along which said pads are positioned.

3. A testing tool as set forth in claim 1, wherein said connector means comprises a test jack substantially identical with one of said miniature jacks in said telephone system.

4. A testing tool as set forth in claim 1, wherein said connector means comprises a test plug substantially identical with one of said miniature plugs in said telephone system.

5. A testing tool as set forth in claim 3, wherein said connector means further comprises a test plug substantially identical with one of said miniature plugs and having a plurality of like test wires terminated thereon and also connected in series with said plurality of exposed conductor means.

6. A testing tool as set forth in claim 4, wherein said connector means further comprises a test jack substantially identical with one of said miniature jacks and having a plurality of like test wires terminated therein and also connected in series with said plurality of exposed conductor means.

7. A testing tool as set forth in claim 2, wherein said connector means comprises a test jack substantially identical with one of said miniature jacks in said telephone system and positioned at one end of said elongated support member.

8. A testing tool as set forth in claim 7, wherein said connector means further comprises a test plug substantially identical with one of said miniature plugs and having a plurality of like test wires terminated therein and also connected in series with said plurality of exposed conductor pads and positioned at the other end of said elongated support member.

9. A testing tool as set forth in claim 2, wherein said connector means comprises a test plug substantially identical with one of said miniature plugs in said telephone system and positioned at one end of said elongated support member.

10. A testing tool as set forth in claim 9, wherein said connector means further comprises a test jack substantially identical with one of said miniature jacks and having a plurality of like test wires terminated therein and also connected in series with said plurality of exposed conductor pads and positioned at the other end of said elongated support member.

11. A testing tool for electrical connector systems of the type that employ miniature modular telephone plugs and jacks, each of said plugs and jacks having at least three wires terminated therein, which comprises:
    connector means adapted to mate with one of said miniature modular plugs or jacks and having at least three test wires terminated;
    at least three exposed conductor pads connected respectively in series with said three test wires for permitting attachment of test apparatus thereto; and
    a rigid, elongated housing for supporting said pads.

12. A testing tool as set forth in claim 11, further comprising additional connector means adapted to mate with one of said miniature modular plugs or jacks and having the other ends of said at least three test wires terminated therein, said at least three exposed conductor pads positioned intermediate said conductor means and said additional connector means.

* * * * *